US012619218B2

(12) United States Patent
Doan et al.

(10) Patent No.: US 12,619,218 B2
(45) Date of Patent: May 5, 2026

(54) USE RESOURCE SETTING METHOD AND USE RESOURCE SETTING DEVICE

(71) Applicant: Hitachi Systems, Ltd., Tokyo (JP)

(72) Inventors: Takeru Doan, Tokyo (JP); Norisuke Fujii, Tokyo (JP); Koichi Hattori, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 314 days.

(21) Appl. No.: 18/489,421

(22) Filed: Oct. 18, 2023

(65) Prior Publication Data

US 2024/0134361 A1 Apr. 25, 2024
US 2024/0231340 A9 Jul. 11, 2024

(30) Foreign Application Priority Data

Oct. 20, 2022 (JP) ................................. 2022-168238

(51) Int. Cl.
*G05B 19/418* (2006.01)
(52) U.S. Cl.
CPC ... *G05B 19/41865* (2013.01); *G05B 19/4188* (2013.01)
(58) Field of Classification Search
None
See application file for complete search history.

(56) References Cited

U.S. PATENT DOCUMENTS 8,924,269 B1 * 12/2014 Seubert .................. G06Q 40/00
705/35
2013/0238381 A1 9/2013 Fujitomi et al.

2018/0046963 A1 2/2018 Kobayashi et al.
2019/0164102 A1 5/2019 Kuroda et al.
2022/0129802 A1 4/2022 Okadome et al.

FOREIGN PATENT DOCUMENTS

JP 2010-238085 A 10/2010
JP 2017162044 A 9/2017

OTHER PUBLICATIONS

Extended European Search Report issued on Dec. 13, 2023 for European Patent Application No. 23203035.3.
Japanese Office Action issued on Mar. 31, 2026 for Japanese Patent Application No. 2022168238.

* cited by examiner

*Primary Examiner* — Mohammad Ali
(74) *Attorney, Agent, or Firm* — Volpe Koenig

(57) ABSTRACT

A use resource setting device includes a control unit and a storage unit. The storage unit holds resource type information, work time information, and production plan information. A use resource setting method includes the control unit predicting calculation accuracy of required time of work in a use resource plan in which one or more resources are allocated to work in each process of producing the product, based on the resource type information, the work time information, and the production plan information, and predicting an evaluation index for producing the product when the use resource plan is adopted, based on the use resource plan, the work time information, and the production plan information. The predicting of the evaluation index includes predicting a variation in the evaluation index based on the calculation accuracy of the required time of the work in the use resource plan by the control unit.

7 Claims, 14 Drawing Sheets

*FIG. 2*

| USE RESOURCE ID | PRODUCT NAME | PROCESS NAME | RESOURCE NAME |
|---|---|---|---|
| USE RESOURCE 001 | PRODUCT A | CUTTING PROCESS | CUTTING 1 |
| USE RESOURCE 002 | PRODUCT A | CUTTING PROCESS | CUTTING 2 |
| USE RESOURCE 003 | PRODUCT A | COATING PROCESS | COATING 1 |
| ⋮ | ⋮ | ⋮ | ⋮ |
| 401 | 402 | 403 | 404 |

| RESOURCE TYPE ID | RESOURCE NAME | RESOURCE TYPE |
|---|---|---|
| RESOURCE TYPE 001 | CUTTING 1 | FACILITY+PEOPLE |
| RESOURCE TYPE 002 | CUTTING 2 | FACILITY+PEOPLE |
| RESOURCE TYPE 003 | COATING 1 | AUTOMATED FACILITY |
| : | : | : |

| WORK RECORD ID | RESOURCE NAME | WORK START | WORK END |
|---|---|---|---|
| WORK RECORD 001 | CUTTING 1 | 12:00 | 12:31 |
| WORK RECORD 002 | COATING 1 | 10:14 | 10:42 |
| WORK RECORD 003 | CUTTING 1 | 14:50 | 15:17 |
| : | : | : | : |
| 601 | 602 | 603 | 604 |

600

700

| WORK TIME ID | RESOURCE NAME | WORK TIME |
|---|---|---|
| WORK TIME 001 | CUTTING 1 | 30 MINUTES |
| WORK TIME 002 | CUTTING 2 | 25 MINUTES |
| WORK TIME 003 | COATING 1 | 43 MINUTES |
| : | : | : |

701       702       703

800

| PRODUCT ID | PRODUCT NAME | NUMBER OF SALES |
|---|---|---|
| PRODUCT 001 | PRODUCT A | 1000 PIECES |
| PRODUCT 002 | PRODUCT B | 500 PIECES |
| PRODUCT 003 | PRODUCT C | 500 PIECES |
| : | : | : |

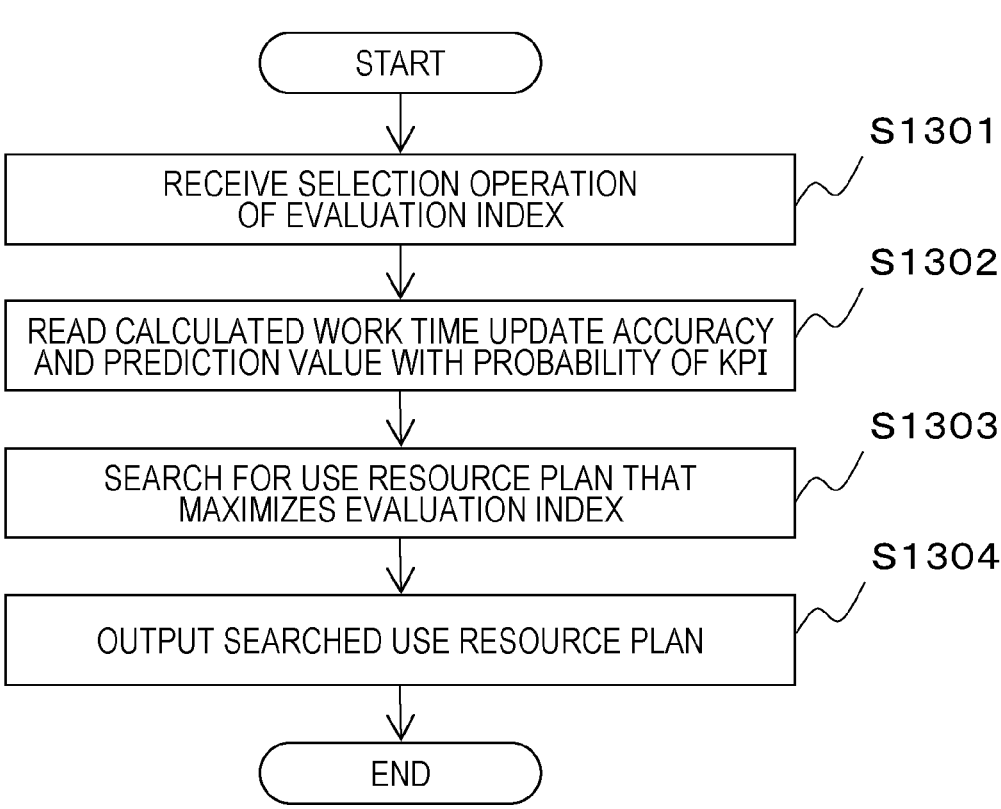

START

S1301

RECEIVE SELECTION OPERATION
OF EVALUATION INDEX

S1302

READ CALCULATED WORK TIME UPDATE ACCURACY
AND PREDICTION VALUE WITH PROBABILITY OF KPI

S1303

SEARCH FOR USE RESOURCE PLAN THAT
MAXIMIZES EVALUATION INDEX

S1304

OUTPUT SEARCHED USE RESOURCE PLAN

END

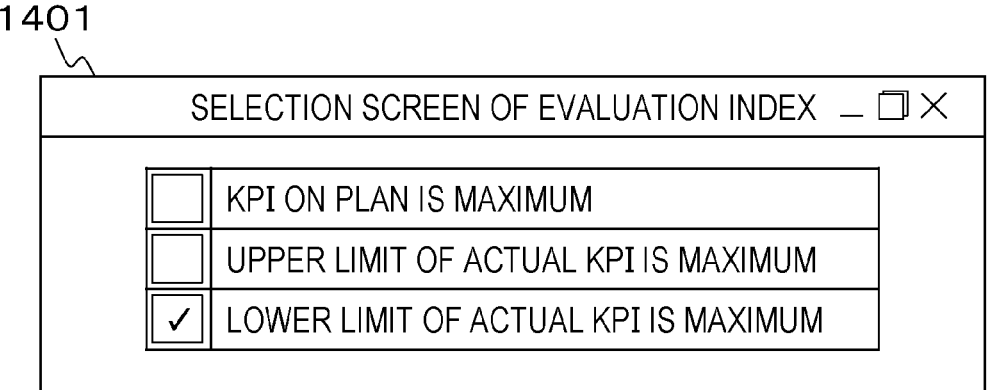

SELECTION SCREEN OF EVALUATION INDEX   _ ☐ ✕

| ☐ | KPI ON PLAN IS MAXIMUM |
| ☐ | UPPER LIMIT OF ACTUAL KPI IS MAXIMUM |
| ✓ | LOWER LIMIT OF ACTUAL KPI IS MAXIMUM |

USE RESOURCE SETTING METHOD AND USE RESOURCE SETTING DEVICE

CLAIM OF PRIORITY

The present application claims priority from Japanese patent application JP 2022-168238 filed on Oct. 20, 2022, the content of which is hereby incorporated by reference into this application.

BACKGROUND OF THE INVENTION

1. Field of the Invention

The present invention relates to a technique for setting a use resource in a production process, the technique achieving both update accuracy and production efficiency at the time of automatically updating work time by utilizing a production record.

2. Description of the Related Art

In modeling of work time utilizing the production record, when the number of candidates for usable manufacturing resources is large, the number of records per resource decreases, and the accuracy of the work time decreases. As a result, various indexes (production KPIs) related to production efficiency decrease as compared with those at the time of planning. On the other hand, when the number of resources is small, it is not possible to make a plan with a favorable production KPI. JP 2010-238085 A discloses "a production information management system that connects a data collection system and a screen display system via a network and manages information such as a key performance indicator (KPI), the information serving as an evaluation index of productivity and reliability in a production system".

SUMMARY OF THE INVENTION

In the modeling of work time utilizing the production record, a method in which use resources are set in advance at the time of designing a new product, and the work time is automatically updated by collecting/analyzing a work record for each resource available in each process after starting mass production is effective. In setting of the use resource, as the number of set resources increases, the update accuracy of the work time decreases, but the KPI in planning improves. Conversely, as the number of resources is reduced, the update accuracy of the work time is improved, but the KPI at the time of planning is decreased. Furthermore, as the update accuracy of the work time becomes smaller, the possibility that the production KPI deviates from the KPI in planning and decreases becomes higher. Therefore, it is a problem to set a use resource in consideration of the update accuracy of work time and a prediction value including the variation in the production KPI at the same time, at the time of designing a new product.

In order to solve at least one of the above problems, the present invention provides a use resource setting method performed by a use resource setting device. The use resource setting device includes a control unit and a storage unit, and in which the storage unit holds resource type information, work time information, and production plan information, the resource type information includes information specifying a type of each resource allowed to be used for work of a process of producing a product, the work time information includes information indicating required time of work performed in the past by using each resource, and the production plan information includes information indicating the number of products planned to be produced. The use resource setting method includes, by the control unit, predicting calculation accuracy of required time of work in a use resource plan in which one or more resources are allocated to work in each process of producing the product, based on the resource type information, the work time information, and the production plan information, and, by the control unit, predicting an evaluation index for producing the product when the use resource plan is adopted, based on the use resource plan, the work time information, and the production plan information. The predicting of the evaluation index includes predicting a variation in the evaluation index based on the calculation accuracy of the required time of the work in the use resource plan by the control unit.

According to one aspect of the present invention, it is possible to set a use resource in consideration of the update accuracy of work time and a prediction value including the variation in the production KPI at the same time, at the time of designing a new product. Objects, configurations, and effects other than those described above will be clarified by the descriptions of the following embodiments.

BRIEF DESCRIPTION OF THE DRAWINGS

FIG. 2 is a block diagram illustrating an example of a hardware configuration for realizing a system in the first embodiment;

FIG. 5 is an explanatory diagram illustrating an example of a resource type information storage unit held in the information storage unit of the use resource setting device in the first embodiment;

FIG. 6 is an explanatory diagram illustrating an example of a past product work record information storage unit held in the information storage unit of the use resource setting device in the first embodiment;

FIG. 13 is a flowchart illustrating an example of a process executed by a use resource plan search function of the use resource setting device in the second embodiment;

FIG. 14 is an explanatory diagram illustrating an example of an evaluation index selection screen displayed by a result display unit of the use resource setting device in the second embodiment.

DESCRIPTION OF THE PREFERRED EMBODIMENTS

Hereinafter, embodiments will be described with reference to the drawings.

First Embodiment

In a first embodiment, a case in which work time update accuracy for a use resource plan and a stochastic prediction value of a KPI are visualized, and a person confirms the result and selects an appropriate use resource will be described as an example.

Figure 1:
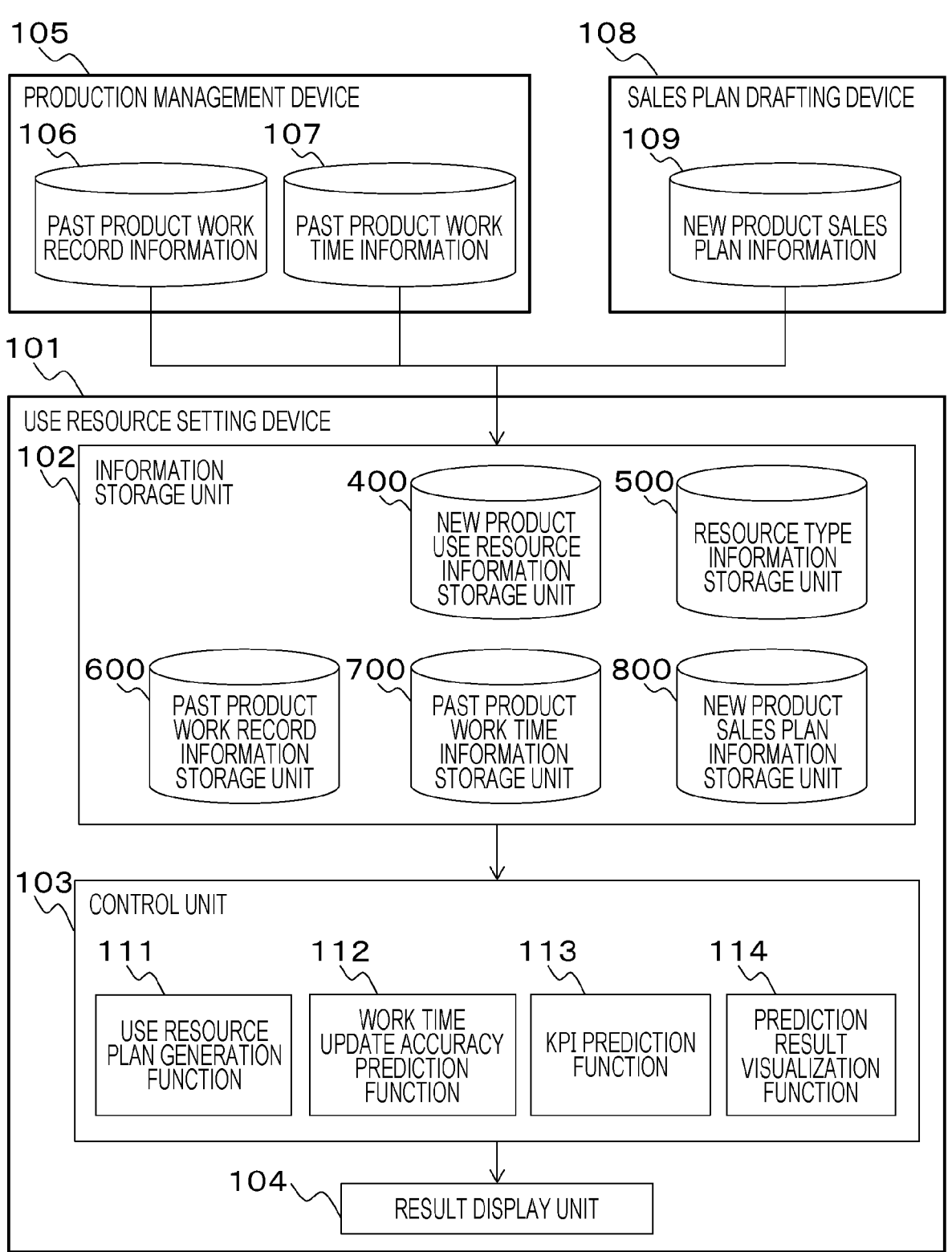
FIG. 1 is a block diagram illustrating an example of a system configuration according to a first embodiment.

FIG. 1 is a block diagram illustrating an example of a system configuration according to the first embodiment.

A use resource setting device 101 in the first embodiment includes an information storage unit 102, a control unit 103, and a result display unit 104.

The information storage unit 102 includes a new product use resource information storage unit 400 and a resource type information storage unit 500.

The information storage unit 102 includes a past product work record information storage unit 600, a past product work time information storage unit 700, and a new product sales plan information storage unit 800. The past product work record information storage unit 600 reads and stores past product work record information 106 included in a production management device 105. The past product work time information storage unit 700 reads and stores past product work time information 107 included in the production management device 105. The new product sales plan information storage unit 800 reads and stores new product sales plan information 109 included in a sales plan drafting device 108.

The production management device 105 is a device that manages production of a product in a factory or the like. The sales plan drafting device 108 is a device that drafts a sales plan of the produced product. It is sufficient that these devices are conventionally used, and thus detailed description thereof will be omitted.

The control unit 103 includes a use resource plan generation function 111, a work time update accuracy prediction function 112, a KPI prediction function 113, and a prediction result visualization function 114. The use resource plan generation function 111 generates all plans for use resources considered from a combination of a facility and a worker that can be used at the time of production. The work time update accuracy prediction function 112 predicts a relationship between the use resource plan and the work time update accuracy. The KPI prediction function 113 predicts a relationship between the use resource plan and a stochastic prediction value of the KPI. The prediction result visualization function 114 visualizes the relationship between the use resource plan and the work time update accuracy and the relationship between the use resource plan and the stochastic prediction value of the KPI. The use resource setting device 101 can set the use resource in consideration of the update accuracy of the work time and the stochastic prediction value of the production KPI at the same time by the above-described functions.

Figure 2:
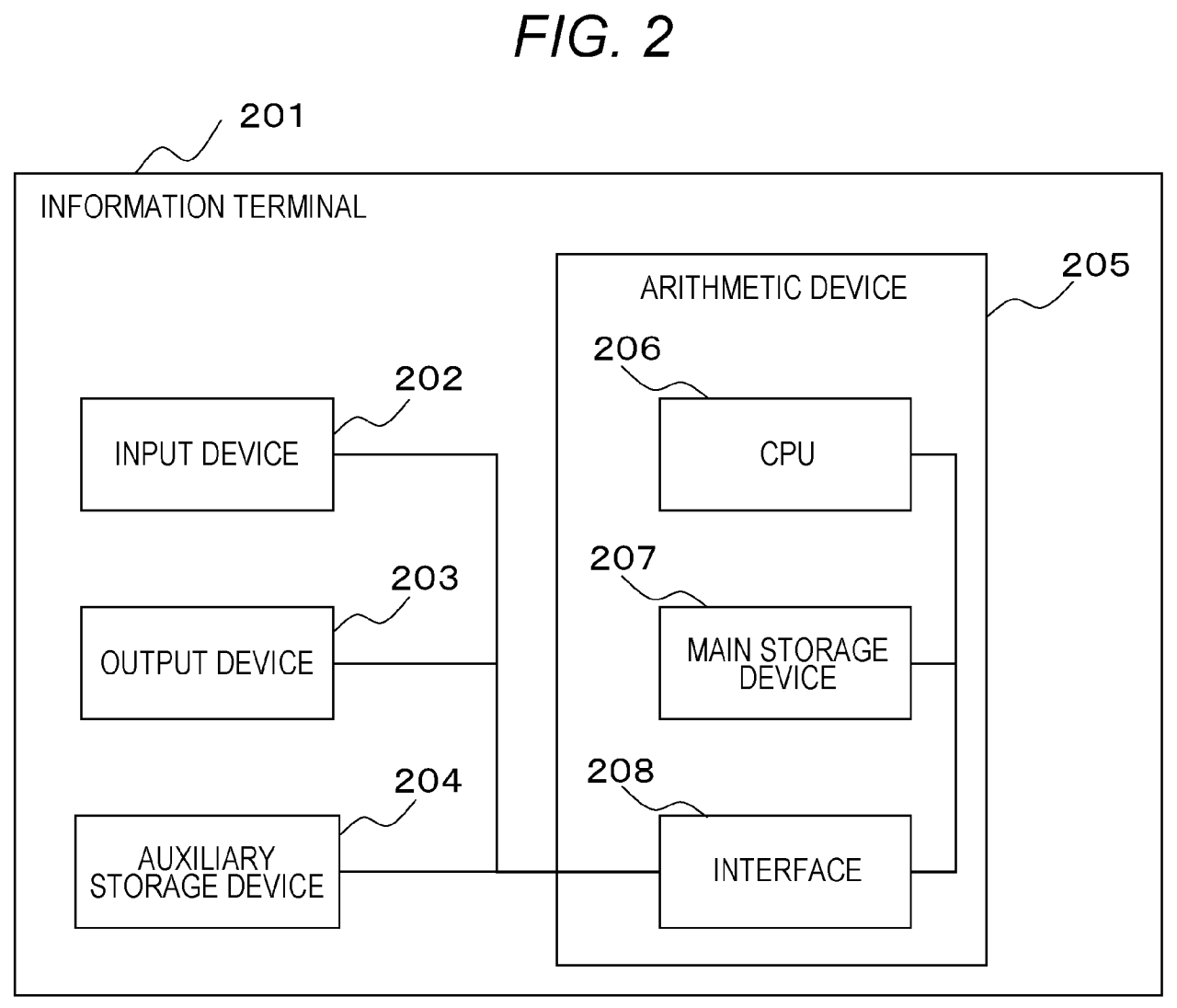

FIG. 2 is a block diagram illustrating an example of a hardware configuration for realizing the system in the first embodiment.

The use resource setting device 101 may be realized by an information terminal 201 illustrated in FIG. 2. The information terminal 201 includes an input device 202 such as a keyboard and a mouse, an output device 203 such as a display, an auxiliary storage device 204, and an arithmetic device 205 that executes various functions. The arithmetic device 205 includes a central processing unit (hereinafter, CPU) 206, a main storage device 207, and an interface 208. The arithmetic device 205 is connected to the input device 202, the output device 203, and the auxiliary storage device 204 via the interface 208. In the present embodiment, the execution result of each of the functions (for example, the use resource plan generation function 111, the work time update accuracy prediction function 112, the KPI prediction function 113, and the prediction result visualization function 114 of the control unit 103) of the use resource setting device 101 is stored in a storage area secured in the main storage device 207. These functions are stored in advance in the auxiliary storage device 204, read into the main storage device 207 at the time of execution, and executed by the CPU 206.

In the present embodiment, a case where the information terminal 201 is realized by a general-purpose information processing device and software will be described as an example. For example, the information terminal 201 may be realized by hardware including hardwired logic, or hardware and a general-purpose information processing device programmed in advance.

Figure 3:
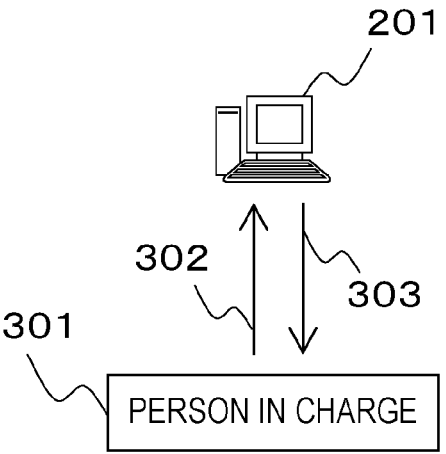
FIG. 3 is a block diagram illustrating an example of an actual use form of an information terminal that realizes the system in the first embodiment.

FIG. 3 is a block diagram illustrating an example of an actual use form of the information terminal 201 that realizes the system in the first embodiment.

As illustrated in FIG. 3, the information terminal 201 can be operated by a person in charge 301. For example, the person in charge 301 can execute an information input process 302 at a certain timing on the information terminal 201 that realizes the use resource setting device 101. The control unit 103 realized by the information terminal 201 calculates the relationship between the use resource plan and the work time update accuracy and the relationship between the use resource plan and the stochastic prediction value of the KPI, and executes an output process 303 of information obtained by visualizing the calculation result. The person in charge 301 can confirm the relationship between the visualized use resource plan and the work time update accuracy, and the relationship between the use resource plan and the stochastic prediction value of the KPI.

Hereinafter, details of each component of the use resource setting device 101 will be described.

Figure 4:
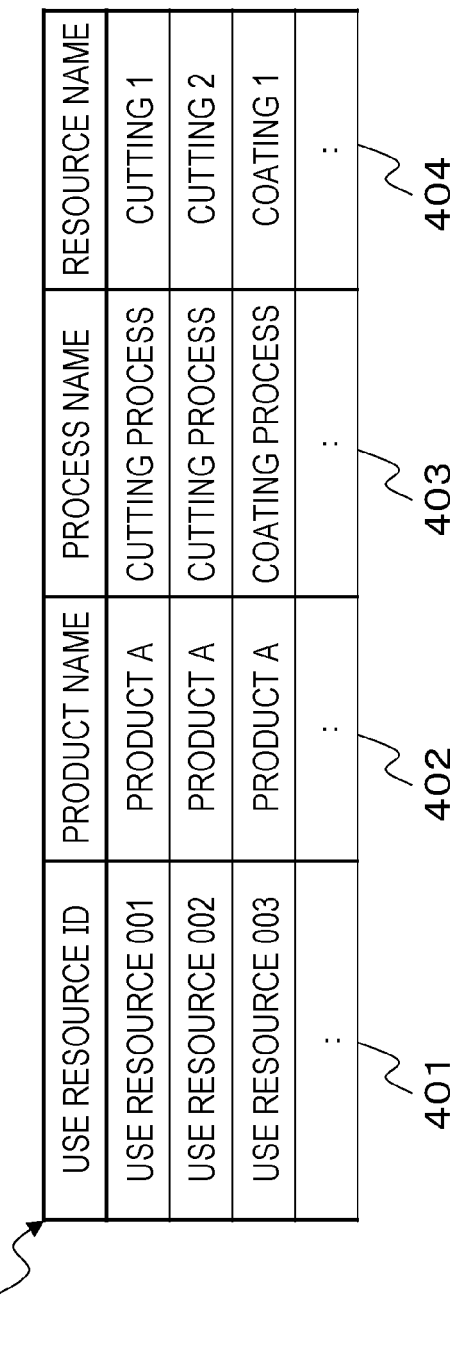
FIG. 4 is an explanatory diagram illustrating an example of a new product use resource information storage unit held in an information storage unit of a use resource setting device in the first embodiment.

FIG. 4 is an explanatory diagram illustrating an example of the new product use resource information storage unit 400 held in the information storage unit 102 of the use resource setting device 101 in the first embodiment.

The new product use resource information storage unit 400 stores information of a process necessary for producing a new product and resources that can be utilized for this process. For example, in the present embodiment, the new product use resource information storage unit 400 stores a table as illustrated in FIG. 4.

The use resource information storage unit 400 illustrated in FIG. 4 has columns 401 to 404. In the column 401, use resource ID information for uniquely identifying each record (that is, each row of the new product use resource information storage unit 400 in FIG. 4) of the new product use resource information storage unit 400 is stored. In the column 402, name information of a new product is stored. In the column 403, process name information of a process necessary for the production of this product is stored. In the column 404, name information of a resource that can be used for this process necessary for the production of this product is stored.

The example of FIG. 4 illustrates that the first and second records indicate that there are at least two resources (for example, machine tools that perform cutting) that can be used for a cutting process for producing a product A, and are identified by resource names of "cutting 1" and "cutting 2", respectively.

The information storage unit 102 in FIG. 1 receives an input process 302 related to new product use resource information by the person in charge 301 in charge in FIG. 3, and stores the input information in the new product use resource information storage unit 400.

FIG. 5 is an explanatory diagram illustrating an example of the resource type information storage unit 500 held in the information storage unit 102 of the use resource setting device 101 in the first embodiment.

The resource type information storage unit 500 stores information for identifying the type of resource for each resource. For example, in the present embodiment, the resource type information storage unit 500 stores a table as illustrated in FIG. 5.

The resource type information storage unit 500 illustrated in FIG. 5 includes columns 501 to 503. In the column 501, resource type ID information for uniquely identifying each record of the resource type information storage unit 500 is stored. In the column 502, name information of a resource is stored. In the column 503, resource type information corresponding to the resource identified by the name stored in the column 502 is stored.

Here, the type of resource is any of "person", "facility+person", and "automated facility". The resource having a type of "person" is, for example, a person such as a worker in a factory. That is, the process using the resource is manually executed by a worker or the like (for example, using a tool or the like). The resource having a type of "facility+person" is, for example, a facility that requires a manual operation. That is, the process using the resource is executed, for example, by a worker or the like operating a facility such as a machine. The resource having a type of "automatic facility" is a facility that operates automatically without requiring a manual operation. That is, the process using the resource is automatically executed by a facility such as a machine.

The type of resource as described above is an example, and the resource may be classified into a type other than the above description. For example, resources may be classified according to the type of facility, performance, a skill level of a person, and the like.

The example of FIG. 5 illustrates that the resources having the resource names of "cutting 1" and "cutting 2" are facilities requiring a manual operation (for example, a machine tool or the like that performs cutting), and the resource having the resource name of "coating 1" is an automated facility that does not require the manual operation.

The information storage unit 102 in FIG. 1 receives the input process 302 related to resource type information by the person in charge 301 in charge in FIG. 3, and stores the input information in the resource type information storage unit 500.

FIG. 6 is an explanatory diagram illustrating an example of the past product work record information storage unit 600 held in the information storage unit 102 of the use resource setting device 101 in the first embodiment.

The past product work record information storage unit 600 stores time information of a start of work and time information of an end of the work for each resource on which production work has been performed, from record information of production of products already mass-produced in the past. For example, in the present embodiment, the past product work record information storage unit 600 stores a table as illustrated in FIG. 6.

The past product work record information storage unit 600 illustrated in FIG. 6 includes columns 601 to 604. In the column 601, work record ID information for uniquely identifying each record of the past product work record information storage unit 600 is stored. In the column 602, name information of a resource on which the work has been performed is stored. In the column 603, time information of a start of work is stored. In the column 604, time information of an end of the work is stored.

The information storage unit 102 of FIG. 1 reads information corresponding to each item described above from the past product work record information 106 stored in the production management device 105 of FIG. 1, and stores the read information in the past product work record information storage unit 600.

Figures 7, 8:
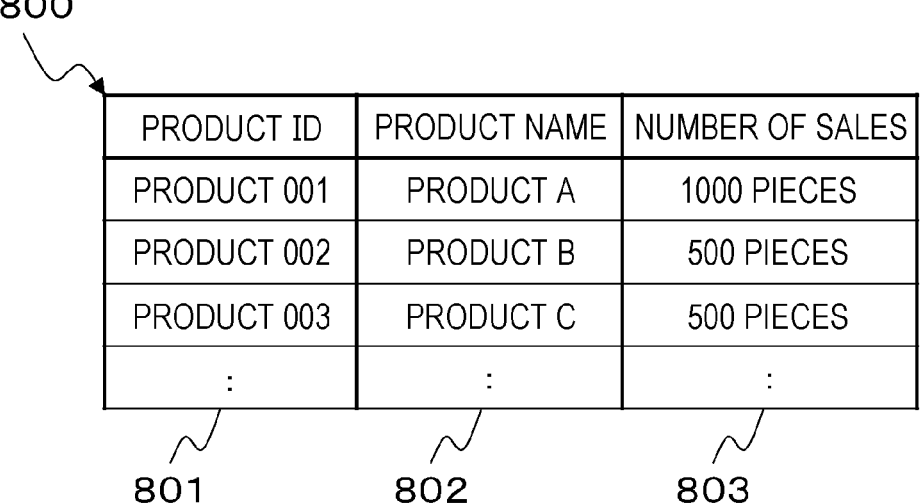
FIG. 7 is an explanatory diagram illustrating an example of a past product work time information storage unit held in the information storage unit of the use resource setting device in the first embodiment.
FIG. 8 is an explanatory diagram illustrating an example of a new product sales plan information storage unit held in the information storage unit of the use resource setting device in the first embodiment.

FIG. 7 is an explanatory diagram illustrating an example of the past product work time information storage unit 700 held in the information storage unit 102 of the use resource setting device 101 in the first embodiment.

The past product work time information storage unit 700 stores reference work time information set for products already mass-produced, for each resource. For example, in the present embodiment, the past product work time information storage unit 700 stores a table as illustrated in FIG. 7.

The past product work time information storage unit 700 illustrated in FIG. 7 includes columns 701 to 703. In the column 701, work time ID information for uniquely identifying each record of the past product work time information storage unit 700 is stored. In the column 702, name information of a resource on which the work has been performed is stored. In the column 703, reference work time information of work is stored. Here, the reference work time may be, for example, a statistical value of the work time for each resource, which has been calculated from a work start time and a work end time of the past product work record information storage unit 600.

The information storage unit 102 of FIG. 1 reads information corresponding to each item described above from the past product work time information 107 stored in the production management device 105 of FIG. 1, and stores the read information in the past product work time information storage unit 700.

FIG. 8 is an explanatory diagram illustrating an example of the new product sales plan information storage unit 800 held in the information storage unit 102 of the use resource setting device 101 in the first embodiment.

The new product sales plan information storage unit 800 stores plan information on the number of sales, which is provided for determining how many new products scheduled to be mass-produced in the future are to be produced. For example, in the present embodiment, the new product sales plan information storage unit 800 stores a table as illustrated in FIG. 8.

The new product sales plan information storage unit 800 illustrated in FIG. 8 includes columns 801 to 803. In the column 801, product ID information for uniquely identifying a new product is stored. In the column 802, name information of this product is stored. In the column 803, plan information of the number of sales of this product is stored.

The information storage unit 102 in FIG. 1 reads information corresponding to each item described above from the new product sales plan information 109 stored in the sales plan drafting device 108 in FIG. 1, and stores the read information in the new product sales plan information storage unit 800.

Next, the entire processing performed by the control unit 103 in FIG. 1 will be described with reference to FIG. 9.

Figure 9:
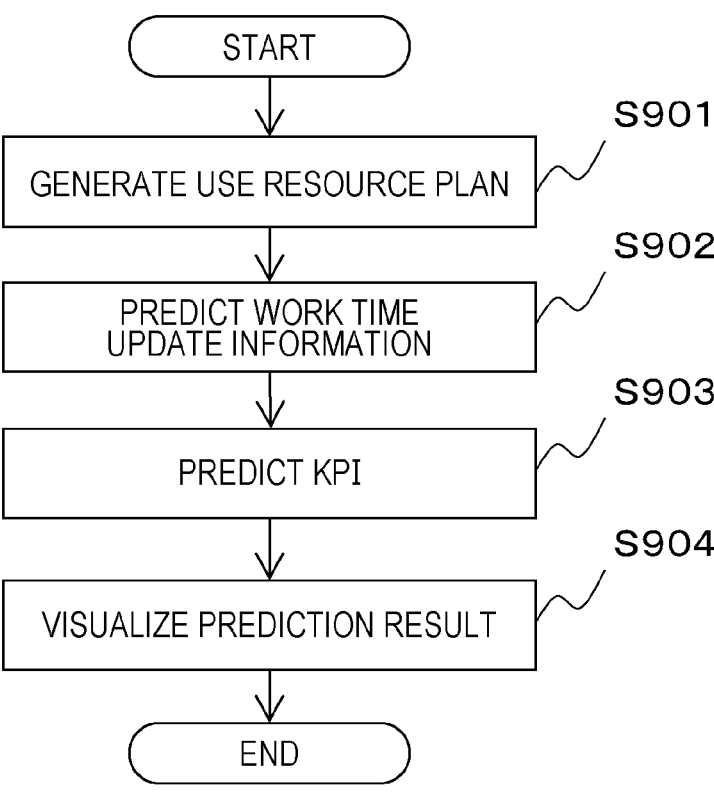
FIG. 9 is a flowchart illustrating an example of processing performed by a control unit of the use resource setting device in the first embodiment.

FIG. 9 is a flowchart illustrating an example of processing performed by the control unit 103 of the use resource setting device in the first embodiment.

First, the use resource plan generation function 111 of the control unit 103 generates a use resource plan (Step S901).

Then, the work time update accuracy prediction function 112 of the control unit 103 calculates a prediction value of the update accuracy of the work time (Step S902). Details of this process will be described later with reference to FIG. 10A.

Then, the KPI prediction function 113 of the control unit 103 calculates a stochastic prediction value of the KPI (Step S903). Details of this process will be described later with reference to FIG. 10B.

Then, the prediction result visualization function 114 visualizes the prediction result (Step S904). Specifically, information for displaying the prediction result is output. Details of this process will be described later with reference to FIG. 11.

Then, processing performed when the control unit 103 of FIG. 1 visualizes the relationship between the use resource plan and the work time update accuracy and the relationship between the use resource plan and the stochastic prediction value of the KPI will be described with reference to FIGS. 10A and 10B.

Figure 10A:
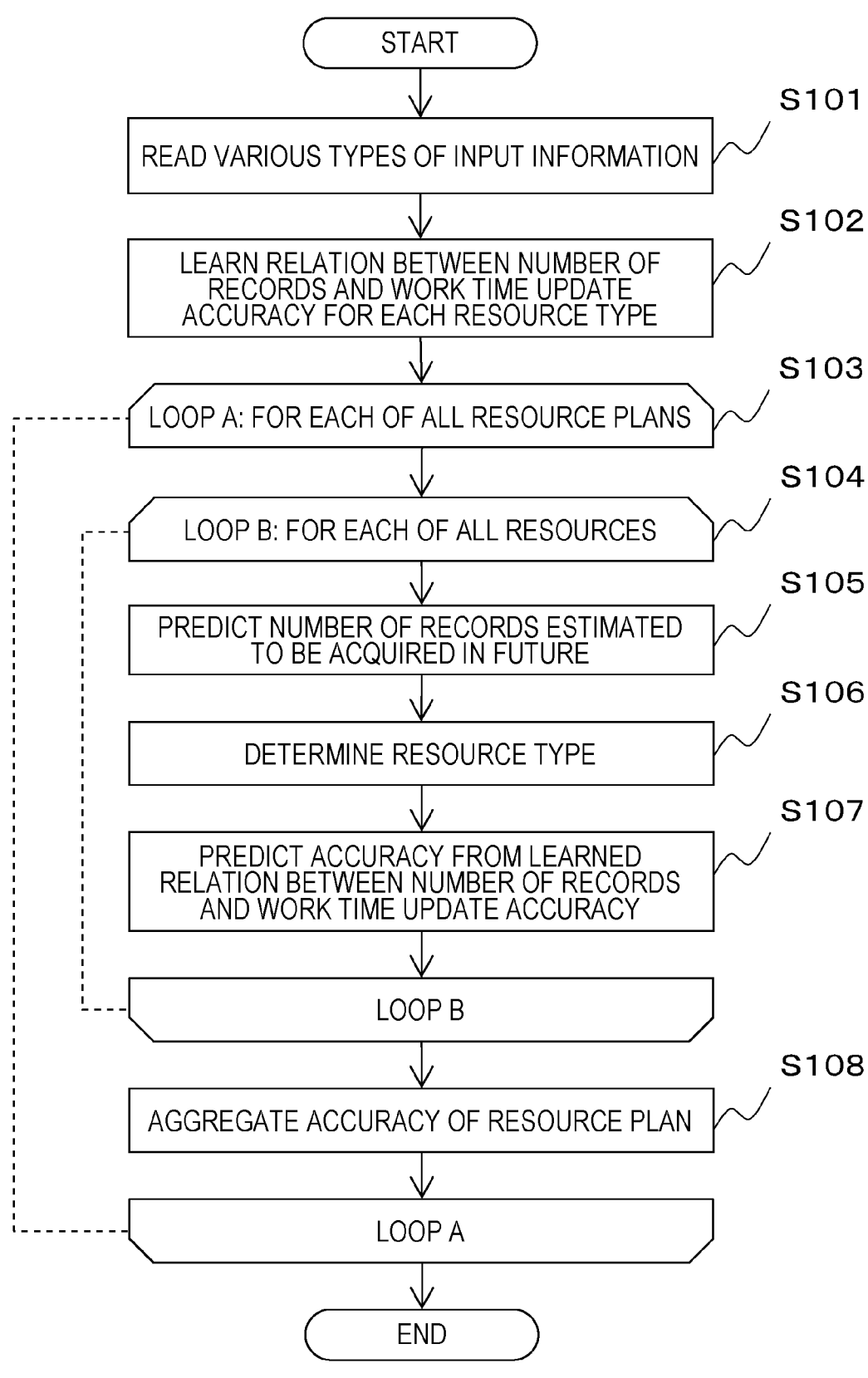
FIG. 10A is a flowchart illustrating an example of a process executed by a work time update accuracy prediction function of the use resource setting device in the first embodiment.

FIG. 10A is a flowchart illustrating an example of the process executed by the work time update accuracy prediction function 112 of the use resource setting device in the first embodiment.

The work time update accuracy prediction function 112 of the control unit 103 reads each information item (columns 401 to 404) in the new product use resource information storage unit, each information item (columns 501 to 503) in the resource type information storage unit, each information item (columns 601 to 604) in the past product work record information storage unit, each information item (columns 701 to 703) in the past product work time information storage unit, and each information item (columns 801 to 803) in the new product sales plan information storage unit, which are provided in the information storage unit 102 (Step S101).

Information of the sales plan of the new product read here is used to predict the number of times of production of the new product (more specifically, the number of records of work for production to be acquired in the future). That is, the number of sales of the new product acquired here is treated as the number of planned production plans of the new product. When the production plan can be acquired from information other than the sales plan, the information may be acquired.

Then, the work time update accuracy prediction function 112 learns the relationship between the number of records and the update accuracy of the work time for each read resource type (Step S102). As means for learning the relationship between the number of records and the update accuracy of the work time, any means can be used. For example, machine learning may be used.

Specifically, the work time update accuracy prediction function 112 assigns each information item (column 601 to column 604) of the read resource type information storage unit 500 to each information item (column 501 to column 503) of the read past product work record information storage unit 600, and thus classifies records of the read past product work record information storage unit 600 for each resource type, and calculates the number of records of the resource type. The work time update accuracy prediction function 112 assigns each information item (columns 701 to 703) of the read resource type information storage unit 500 to each information item (columns 501 to 503) of the read past product work time information storage unit 700, and thus extracts reference work time information for each resource type.

The work time update accuracy prediction function 112 calculates update accuracy when the work time information is updated by using the work record information, from the work record information for each classified resource type and the extracted reference work time information for each resource type. The relationship between the number of the records and the update accuracy of the work time for each resource type can be learned in a manner that machine learning is performed by using, as training data, the relationship between the number of records for each resource type calculated from the past information and the update accuracy for each resource type calculated from the past information.

In general, as the number of records increases, the update accuracy of the work time tends to increase. In addition, when the resource type is an automated facility ("automated facility" in the example of FIG. 5) that performs work without human intervention, the variation in work time tends to be small as compared with the other cases ("facility+ person" or "person" in the example of FIG. 5). Therefore, even if the number of records is equal, the update accuracy of the work time when the resource type is the automated facility tends to be higher than the update accuracy of the work time in other cases. For example, the tendency as described above may be learned by using the relationship between the number of records and the update accuracy of the work time for each resource type.

Then, the work time update accuracy prediction function 112 executes the following processes of Steps S104 to S108 on all the use resource plans considered from the combination of a facility and a worker that can be used at the time of production, which has been generated by the use resource plan generation function 111 (Step S103). The use resource plan generation function 111 may generate all the use resource plans by, for example, the following method. That is, the use resource plan generation function 111 can generate all the use resource plans by performing aggregation for each information item (columns 401 to 404) of the read new product use resource information storage unit 400 by using the product name information 402 as a key for each product and listing all of combination patterns of resources that can be used for each process executed when each product is manufactured.

Then, the work time update accuracy prediction function 112 executes the following processes of Steps S105 to S107 on all resources included in one use resource plan (Step S104).

The work time update accuracy prediction function 112 predicts the number of records that can be acquired in the future by the resource using the read sales plan information of the new product (S105). As means for predicting the number of records that can be acquired in the future by a certain resource, the number of records that can be acquired in the future by a certain resource can be predicted by assigning a certain use resource plan of the product to each piece of information (columns 801 to 803) of the read new product sales plan information storage unit, for example, by assuming that work is equally allocated to a plurality of selectable resources.

For example, when the new product is a product A, the number of sales of the product A based on the sales plan is 1000. Here, when two resources of "cutting 1" and "cutting 2" are used in a cutting process of the product A in a certain use resource plan, the number of records that can be acquired in the future in each resource may be "500" in which 1000 pieces are equally allocated to the two resources. The number of records that can be acquired in the future may be calculated by a method other than equal allocation according to the state of each resource or the like.

Then, the work time update accuracy prediction function 112 determines the resource type of the resource by using each information item (columns 501 to 503) of the read resource type information storage unit (Step S106).

The work time update accuracy prediction function 112 predicts the update accuracy of the work time in the resource (Step S107). For example, the work time update accuracy prediction function 112 can predict the update accuracy of the work time by extracting the relationship between the number of records of the resource type and the update accuracy of the work time from the relationship between the number of records of each resource type and the update accuracy of the work time learned in Step S102, and the resource type information determined in Step S106, and assigning the number of records that can be acquired in the future, which has been predicted in Step S105, to the extracted relationship between the number of records of the resource type and the update accuracy of the work time.

The work time update accuracy prediction function 112 executes the processes in and after Step S105 on all the resources included in one use resource plan, and then aggregates the work time update accuracy of the use resource plan (Step S108). For example, the work time update accuracy prediction function 112 may obtain the work time update accuracy of the use resource plan by a weighted sum obtained by applying a predetermined weighting factor to the update accuracy of the work time of the resource of each process of the use resource plan.

The work time update accuracy prediction function 112 obtains the work time update accuracy for each use resource plan by executing the processes of Steps S104 to S108 on all the use resource plan.

The work time update accuracy may be paraphrased as calculation accuracy of a new work time for updating information of the work time.

Figure 10B:
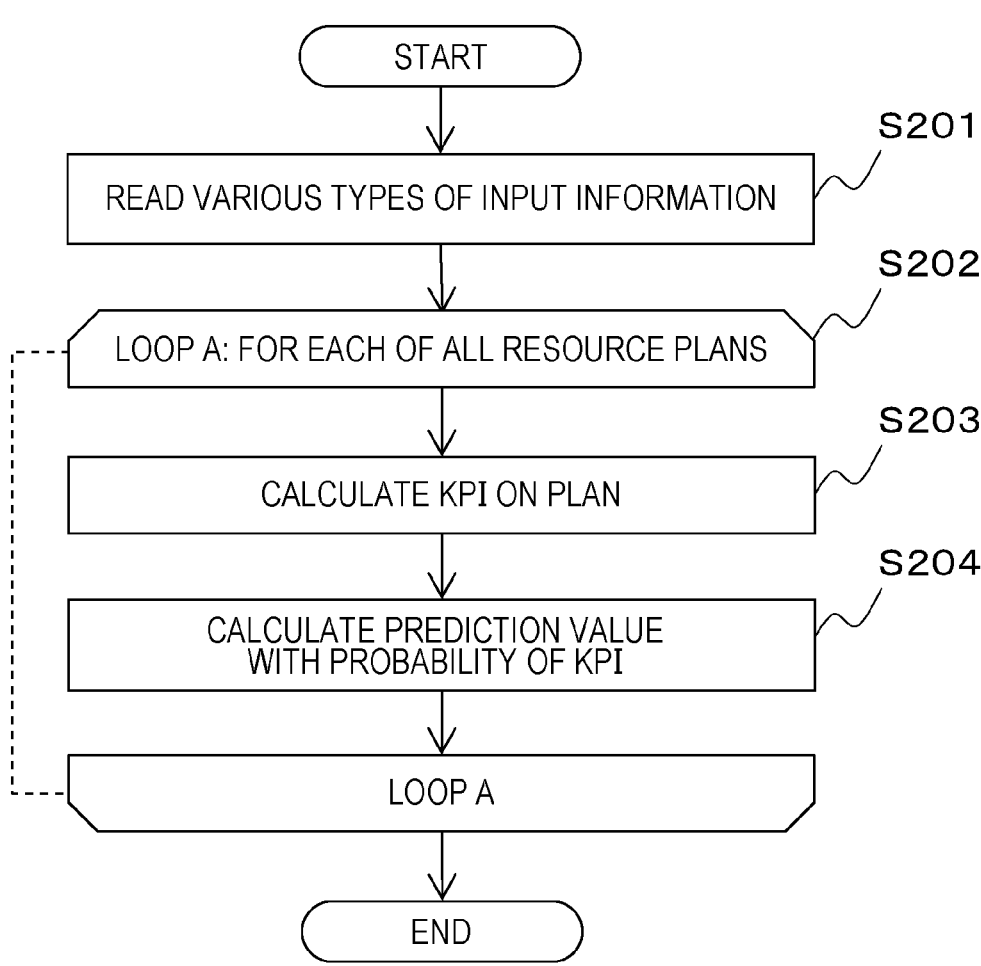
FIG. 10B is a flowchart illustrating an example of a process executed by a KPI prediction function of the use resource setting device in the first embodiment.

FIG. 10B is a flowchart illustrating an example of a process executed by the KPI prediction function 113 of the use resource setting device in the first embodiment.

When the work time update accuracy prediction function 112 calculates the work time update accuracy for each resource plan by the processing illustrated in FIG. 10A, the KPI prediction function 113 of the control unit 103 then executes the processing illustrated in FIG. 10B. First, the KPI prediction function 113 reads the work time update accuracy information of each resource plan calculated by the work time update accuracy prediction function 112 in addition to the information included in the information storage unit 102 (Step S201).

The KPI prediction function 113 executes the following processes on all use resource plans that are generated by the use resource plan generation function 111 and can be considered from the combination of the facility and the worker that can be used at the time of production (Step S202).

The KPI prediction function 113 calculates a planned KPI for one use resource plan (Step S203). For example, the KPI prediction function 113 may allocate each piece of work to each resource on the assumption that work is equally allocated to a plurality of selectable resources when a new product is produced as many as the number of sales 803 of the new product, then calculate the time from the start time to the end time of each piece of work by using event-driven simulation, and prepare the production plan of the new product.

As the work time of each piece of work used for calculating the time from the start time to the end time of each piece of work, for example, the work time 703 of each resource included in the read past product work time information storage unit 700 may be diverted, or the estimated value of the work time of the new product input by the person in charge 301 in charge in the input process 302 may be used. The planned KPI for one use resource plan can be calculated by calculating the number of production units per unit time, the utilization rate of each resource, and the like for the prepared production plan.

Then, the KPI prediction function 113 calculates a stochastic prediction value of the KPI, which represents a deviation between the planned KPI and the KPI when actual production is performed (Step S204). For example, the KPI prediction function 113 uses the read work time update accuracy information and gives a range centered on the reference work time to the work time of each use resource based on the magnitude of the value of the work time update accuracy for each resource type. The KPI prediction function 113 prepares a plurality of patterns of production plans while changing the work time used when the event-driven simulation is performed within the range of the work time. For each production plan, the KPI such as the number of production units per unit time and the utilization rate of each resource is calculated and aggregated, and, in this manner, it is possible to calculate the stochastic prediction value of the KPI for one use resource plan.

Here, the stochastic prediction value of the KPI may be a value indicating the magnitude of a variation in the KPI predicted based on the work time update accuracy. For example, in the calculation of the stochastic prediction value of the KPI (Step S204), the KPI prediction function 113 may calculate the KPI of the plurality of patterns of production plans prepared for one use resource plan as described above, and acquire the maximum value and the minimum value of the range in which the KPI varies, as the stochastic prediction value of the KPI based on the work time update accuracy in each resource. The maximum value and the minimum value of the range in which the KPI varies are also referred to as an actual KPI upper limit and an actual KPI lower limit in the use resource plan, respectively. In general, the lower the work time update accuracy of the resource included in the use resource plan, the larger the range in which the KPI varies.

The KPI prediction function 113 calculates the stochastic prediction value of the KPI for each use resource plan by executes the processes of Steps S203 and S204 on all the use resource plans.

Figure 11:
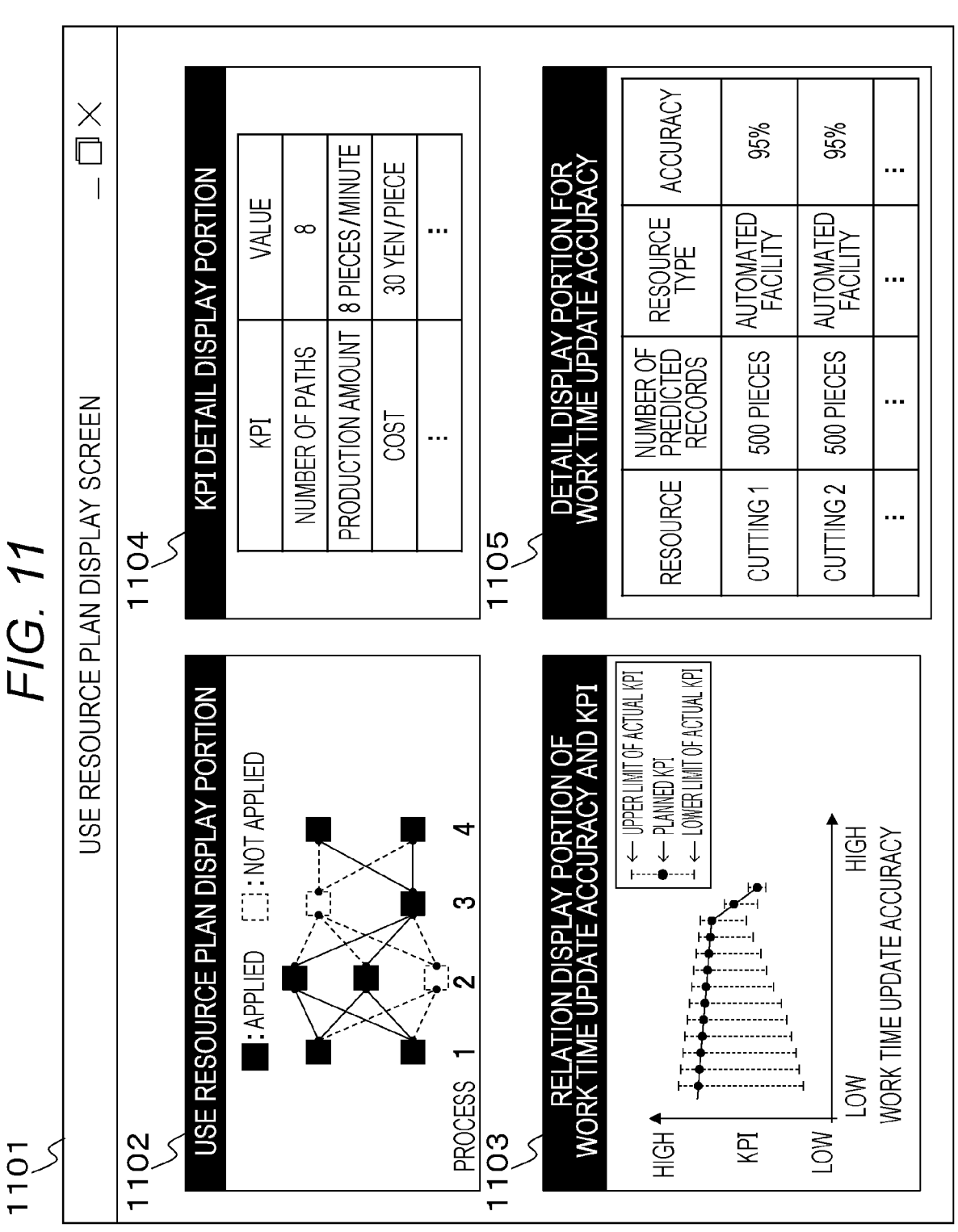
FIG. 11 is an explanatory diagram illustrating an example of a use resource plan display screen displayed by a result display unit of the use resource setting device in the first embodiment.

Then, the prediction result visualization function 114 of the control unit 103 displays the calculated work time update accuracy for each resource plan and the stochastic prediction value of the KPI on the result display unit 104 of the use resource setting device 101 in a format as illustrated in FIG. 11, for example.

FIG. 11 is an explanatory diagram illustrating an example of a use resource plan display screen displayed by the result display unit 104 of the use resource setting device 101 in the first embodiment.

A use resource plan display screen 1101 as an output screen example in the first embodiment illustrated in FIG. 11 includes a use resource plan display portion 1102, a relationship display portion 1103 of the work time update accuracy and the KPI, a KPI detail display portion 1104, and a detail display portion 1105 for the work time update accuracy.

The use resource plan display portion 1102 of the use resource plan display screen 1101 can receive the input process 302 of selecting any resource by the person in charge 301 in charge. The result display unit 104 updates the display contents of the use resource plan display portion 1102, the relationship display portion 1103 of the work time update accuracy and the KPI, and the KPI detail display portion 1104 so as to visualize the work time update accuracy calculated for the resource plan based on the resource selected by the person in charge 301 and the stochastic prediction value information of the KPI.

Here, a specific example of the output screen of FIG. 11 will be described. The use resource plan display portion 1102 displays a resource to which work of a process can be allocated, and a resource to which work is allocated in the use resource plan for each process necessary for producing a new product (for example, the product A). In FIG. 11, the resource to which work is assigned in the use resource plan (that is, applied resource) is indicated by a filled rectangle, and the resource to which work can be assigned but no work is assigned in the use resource plan (that is, non-applied resource) is indicated by a white dotted rectangle.

In the example of FIG. 11, an example of assignment of work of four processes from Process 1 to Process 4 for production of a new product is illustrated. In this example, pieces of work of Processes 1, 2, 3, and 4 can be allocated to two, three, two, and two resources, respectively. In the displayed use resource plan, the work of Processes 1, 2, 3, and 4 is allocated to two, two, one, and two resources, respectively.

The KPI detail display portion 1104 displays the value of the KPI predicted for the use resource plan displayed on the use resource plan display portion 1102. The KPI displayed here may be the planned KPI calculated in Step S203. Various indicators can be used as the KPI. In the example of FIG. 11, the number of routes of resources via from the input of the product to the production line to the completion, the production amount per unit time, the production cost, and the like are calculated and displayed.

The detail display portion 1105 for the work time update accuracy displays information regarding the work time update accuracy predicted for the use resource plan displayed on the use resource plan display portion 1102. Specifically, the detail display portion 1105 for the work time update accuracy may display the name of each applied resource in the displayed use resource plan, the number of records predicted in Step S105 for each applied resource, the resource type determined in Step S106 for each applied resource, and the work time update accuracy predicted in Step S107 for each applied resource.

The relationship display portion 1103 of the work time update accuracy and the KPI displays not only the use resource plan displayed on the use resource plan display portion 1102 but also the relationship between the work time update accuracy and the KPI, which has been calculated for all the use resource plans generated by the use resource plan generation function 111. In FIG. 11, a graph in which the work time update accuracy is on the horizontal axis and the KPI is on the vertical axis is displayed. A black circle plotted on the graph is the planned KPI calculated for each use resource plan, and an error bar indicates a range from the upper limit value to the lower limit value of the actual KPI.

In general, the smaller the number of applied resources, the lower the KPI such as the production amount per unit time. However, as the number of applied resources decreases, the number of records of works performed on each resource increases, and thus the update accuracy of the work time increases. Therefore, the value of the KPI on the plan tends to decrease as the use resource plan has higher work time update accuracy. The upper limit value of the actual KPI also has a similar tendency. On the other hand, since the variation in the KPI tends to increase as the update accuracy of the work time decreases, the lower limit value of the actual KPI may also increase as the update accuracy of the work time increases.

In the example of FIG. 11, the upper limit values of the planned KPI and the actual KPI monotonously decrease with respect to the increase in the work time update accuracy, whereas the lower limit value of the actual KPI has a peak. Therefore, for example, when the person in charge 301 emphasizes the value of the KPI that does not consider the variation, it is appropriate to adopt the use resource plan that maximizes the KPI on the plan and minimizes the work time update accuracy. However, when it is emphasized that a relatively good KPI can be obtained even in the worst case, it is appropriate to adopt the use resource plan that maximizes the lower limit value of the actual KPI.

The person in charge may designate whether to apply or not to apply each resource by clicking or tapping the rectangle of each resource displayed on the used resource plan display portion 1102. Accordingly, when the use resource plan is changed, the display of the KPI detail display portion 1104 and the display of the detail display portion 1105 for the work time update accuracy are also changed accordingly. In addition, among the KPIs displayed in the relationship display portion 1103 of the work time update accuracy and the KPI, a KPI corresponding to the use resource plan displayed in the use resource plan display portion 1102 may be displayed in distinction from other KPIs (for example, with a color, a figure, or the like different from those for other persons).

As described above, since it is possible to visualize the work time update accuracy with respect to the use resource plan and the stochastic prediction value of the KPI (for example, the prediction value in the range in which the KPI varies) and allow the person to determine the trade-off and select an appropriate used resource, it is possible to set the use resource in consideration of the update accuracy of the work time and the stochastic prediction value of the production KPI at the same time.

Second Embodiment

In a second embodiment, a case of searching for a use resource plan that maximizes a preset evaluation index based on the work time update accuracy with respect to the use resource plan and the calculation result of the stochastic prediction value of the KPI will be described. Except for the differences described below, each unit of the system in the second embodiment has the same function as each unit denoted by the same reference sign of the first embodiment, and thus the description thereof will be omitted.

Figure 12:
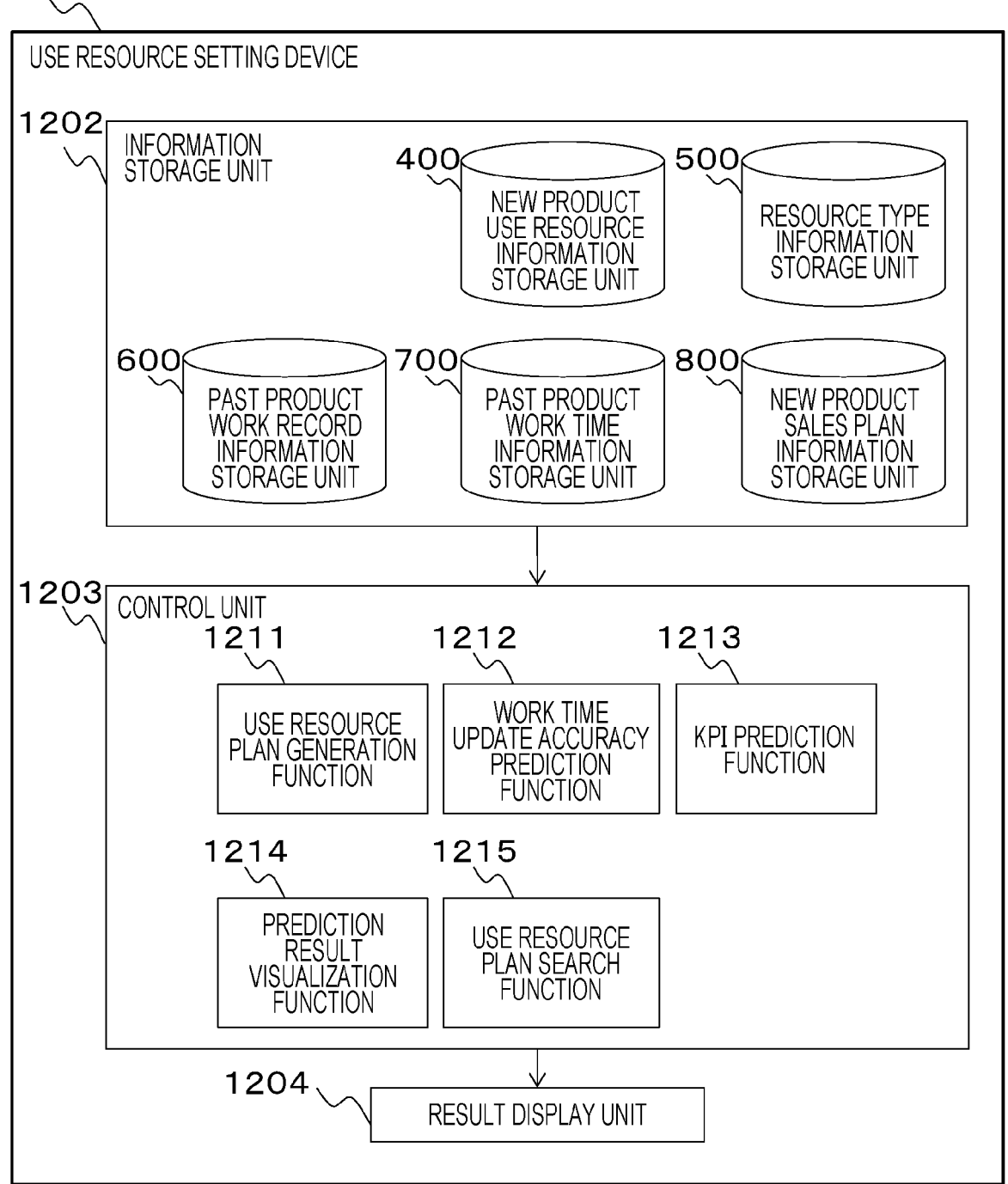
FIG. 12 is a block diagram illustrating a system configuration of a use resource setting device according to a second embodiment.

FIG. 12 is a block diagram illustrating a system configuration of a use resource setting device according to the second embodiment.

Various devices connected to a use resource setting device 1201 are similar to the various devices connected to the use resource setting device 101 in the system configuration in the first embodiment illustrated in FIG. 1, and thus, are not illustrated in FIG. 12.

The use resource setting device 1201 described in the second embodiment basically has the same configuration as the use resource setting device 101 in the system configuration of the first embodiment illustrated in FIG. 1, and can calculate the work time update accuracy for the use resource plan and the stochastic prediction value of the KPI by the means described in the first embodiment.

That is, the use resource setting device 1201 in the first embodiment includes an information storage unit 1202, a control unit 1203, and a result display unit 1204. The information storage unit 1202 includes a new product use resource information storage unit 400, a resource type information storage unit 500, a past product work record information storage unit 600, a past product work time information storage unit 700, and a new product sales plan information storage unit 800. Since these components are similar to those included in the information storage unit 102 of the use resource setting device 101 in the first embodiment, the description thereof will be omitted.

The control unit 1203 includes a use resource plan generation function 1211, a work time update accuracy prediction function 1212, a KPI prediction function 1213, a prediction result visualization function 1214, and a use resource plan search function 1215. Among the functions, the use resource plan generation function 1211, the work time update accuracy prediction function 1212, the KPI prediction function 1213, and the prediction result visualization function 1214 are similar to the use resource plan generation function 111, the work time update accuracy prediction function 112, the KPI prediction function 113, and the prediction result visualization function 1214 in the first embodiment, respectively, and thus, description thereof is omitted. That is, each of these functions executes processing similar to that in FIGS. 9 to 10B. The use resource plan search function 1215 searches for a use resource plan that maximizes the evaluation index with respect to a preset evaluation index.

Processing performed when the use resource plan search function 1215 of the use resource setting device 1201 searches for a use resource plan that maximizes the evaluation index will be described with reference to FIG. 13. The process of the use resource plan search function 1215 may be executed in Step S904 in FIG. 9.

FIG. 13 is a flowchart illustrating an example of the process executed by the use resource plan search function 1215 of the use resource setting device 1201 in the second embodiment.

First, the use resource plan search function 1215 of the use resource setting device 1201 receives an evaluation index selection operation (Step S1301). For example, the use resource plan search function 1215 may receive the evaluation index selection operation by using an evaluation index selection screen 1401 as illustrated in a first output screen example (FIG. 14) of the second embodiment.

FIG. 14 is an explanatory diagram illustrating an example of the evaluation index selection screen displayed by the result display unit 1204 of the use resource setting device 1201 in the second embodiment.

Specifically, the result display unit 1204 displays some evaluation indexes designed in advance on the evaluation index selection screen 1401, and receives input process 302 for selecting an evaluation index by the person in charge 301 in charge. In the present embodiment, as illustrated in FIG. 14, three candidates of (1) the maximum planned KPI, (2) the maximum upper limit of the actual KPI, and (3) the maximum lower limit of the actual KPI are given as the selection candidates of the evaluation index.

(1) When the maximum planned KPI is selected as the evaluation index, the use resource plan that maximizes the planned KPI is searched without considering a deviation between the planned KPI and the KPI when actual production is performed.

(2) When the maximum upper limit of the actual KPI is selected as the evaluation index, the use resource plan that maximizes the maximum value of the stochastic prediction value of the production KPI calculated by the means described in the first embodiment, in other words, the use resource plan that maximizes the KPI when the actual production is most rationally performed is searched.

(3) When the maximum lower limit of the actual KPI is selected as the evaluation index, the use resource plan that maximizes the minimum value of the stochastic prediction value of the production KPI calculated by the means described in the first embodiment, in other words, the use resource plan that can maximize the KPI even when the actual production is performed most unreasonably is searched.

Then, the use resource plan search function 1215 of the use resource setting device 1201 reads the work time update accuracy for the use resource plan and the stochastic prediction value of the KPI calculated by the means described in the first embodiment (Step S1302).

The use resource plan search function 1215 of the use resource setting device 1201 searches for a use resource plan that maximizes the selected evaluation index (Step S1303). For example, when the selected evaluation index is (3) the maximum lower limit of the actual KPI, the entire search is performed for all the use resource plans generated by the means described in the first embodiment, and the use resource plan in which the minimum value of the stochastic prediction value of the production KPI is the largest is searched for. The use resource plan obtained as a result of the search (the use resource plan with the maximum lower limit of the actual KPI in the above example) will be referred to as the searched use resource plan in the following description.

The use resource plan search function 1215 of the use resource setting device 1201 outputs the searched use resource plan (S1304). For example, the use resource plan search function 1215 displays a screen in a format such as the output screen example 2 of the second embodiment illustrated in FIG. 15 on the result display unit 1204 of the use resource setting device 1201.

Figure 15:
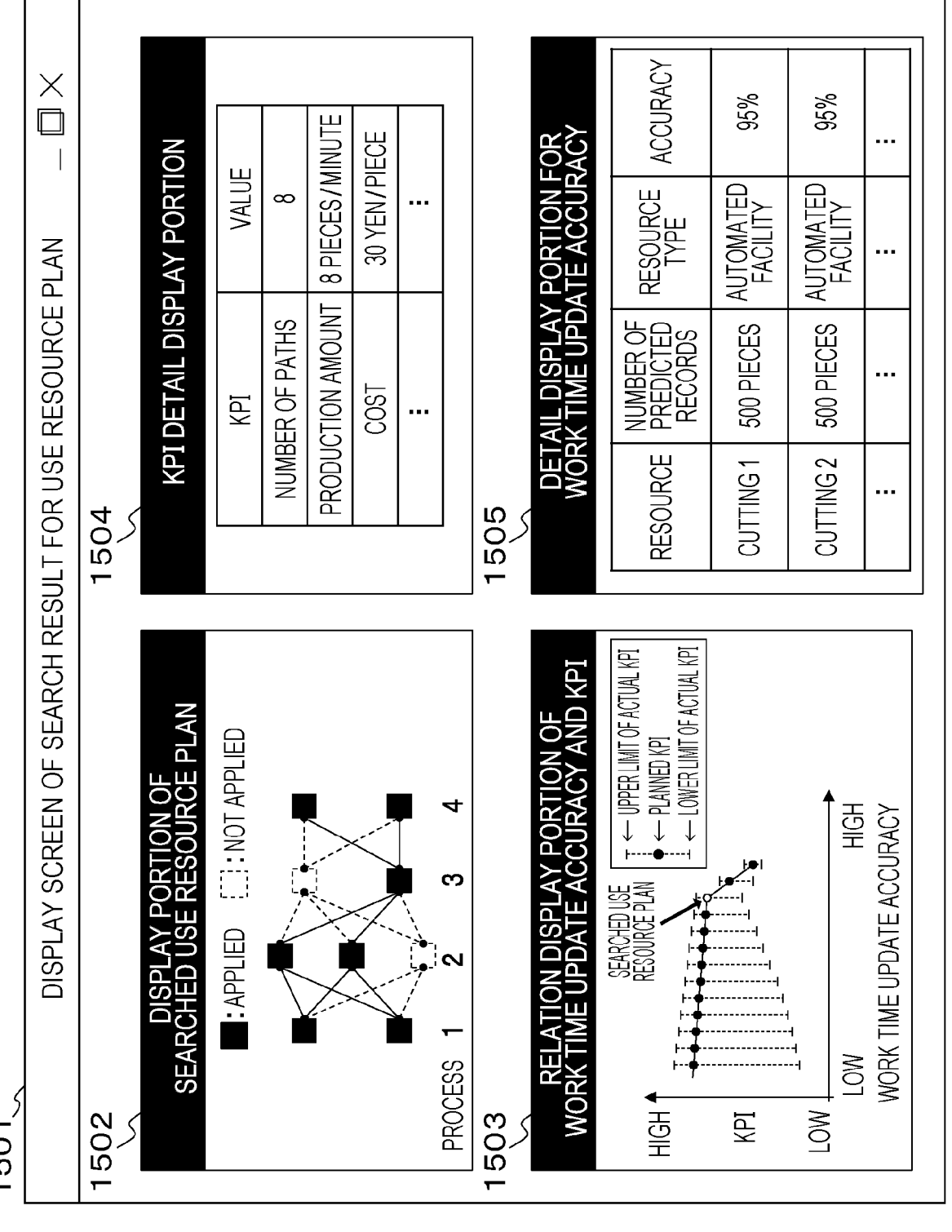
FIG. 15 is an explanatory diagram illustrating an example of a use resource plan search result display screen displayed by the result display unit of the use resource setting device in the second embodiment.

FIG. 15 is an explanatory diagram illustrating an example of a use resource plan search result display screen displayed by the result display unit 1204 of the use resource setting device 1201 in the second embodiment.

A use resource plan search result display screen 1501 illustrated in FIG. 15 includes a display portion 1502 for a use resource plan that has been searched, a relationship display portion 1503 of the work time update accuracy and the KPI, a KPI detail display portion 1504, and a detail display portion 1505 for the work time update accuracy.

The display portion 1502 of the searched use resource plan on the search result display screen 1501 of the use resource plan displays the resource applied in the searched use resource plan and the resource not applied. The method of displaying the searched use resource plan on the display portion 1502 may be similar to that in the use resource plan display portion 1102 of the first embodiment.

The relationship display portion 1503 of the work time update accuracy and the KPI on the search result display screen 1501 for a use resource plan displays the position of the searched use resource plan in the relationship between the work time update accuracy and the KPI. The display method of the relationship display portion 1503 of the work time update accuracy and the KPI may be basically similar to that in the relationship display portion 1103 between the work time update accuracy and the KPI of the first embodiment. In the relationship display portion 1503 of the work time update accuracy and the KPI, the KPI corresponding to the searched use resource plan may be clearly indicated by highlight display or the like.

The KPI detail display portion 1504 on the search result display screen 1501 for a use resource plan displays detailed information of the KPI when the searched use resource plan is applied. A display method of the KPI detail display portion 1504 may be similar to that in the KPI detail display portion 1104 in the first embodiment.

The detail display portion 1505 for the work time update accuracy on the search result display screen 1501 for a use resource plan displays detailed information of the work time update accuracy when the searched use resource plan is applied. The display method of the detail display portion 1505 for the work time update accuracy may be similar to that in the detail display portion 1105 for the work time update accuracy in the first embodiment.

As described above, it is possible to search for the use resource plan that maximizes the evaluation index and output the searched use resource plan based on the work time update accuracy with respect to the use resource plan and the calculation result of the stochastic prediction value of the KPI.

In addition, the system in the embodiments of the present invention may be configured as follows:

(1) There is provided a use resource setting method performed by a use resource setting device (for example, use resource setting device 101 or 1201) including a control unit (for example, control unit 103 or 1203) and a storage unit (for example, storage unit 102 or 1202), in which the storage unit holds resource type information (for example, information included in resource type information storage unit 500), work time information (for example, information included in work record information storage unit 600 of a past product), and production plan information (for example, information included in sales plan information storage unit 800 of a new product), the resource type information includes information specifying a type of each resource that can be used for work of a process of producing a product, the work time information includes information indicating time required for work executed in the past using each resource, and the production plan information includes information indicating the number of products planned to be produced. The use resource setting method includes a first procedure (for example, Step S902 and FIG. 10A) in which the control unit predicts calculation accuracy of required time for work in a use resource plan for allocating one or more resources to work in each process of producing a product based on the resource type information, the work time information, and the production plan information; and a second procedure (for example, Step S903 and FIG. 10B) in which the control unit predicts an evaluation index (for example, KPI such as production amount and cost) of production of a product when the use resource plan is adopted based on the use resource plan, the work time information, and the production plan information, in which the second procedure includes a procedure (for example, Step S204) in which the control unit predicts variation in the evaluation index based on calculation accuracy of the required time for work in the use resource plan.

As a result, it is possible to calculate the prediction value including the work time update accuracy with respect to the use resource plan and the variation in the evaluation index (KPI) and to set the use resource in consideration of these elements.

(2) In (1) above, the storage unit further holds use resource information (for example, information included in the new product use resource information storage unit 400), the use resource information includes information specifying one or more resources that can be used for work of a process for each process of producing a product, the use resource setting method further includes a third procedure (for example, Step S901) in which the control unit generates a plurality of use resource plans based on the use resource information, and the first procedure and the second procedure are executed for each of the plurality of use resource plans generated in the third procedure.

As a result, it is possible to set an appropriate use resource from a plurality of use resource plans.

(3) In (1) above, a fourth procedure (for example, Step S904) in which the control unit outputs information for displaying the result of predicting the variation in the evaluation index on the screen is further included.

As a result, it is possible to visualize the work time update accuracy with respect to the use resource plan and the prediction value in the range in which the KPI varies, and select an appropriate use resource by allowing the person to determine the trade-off.

(4) In the first procedure of (1), the control unit learns the relationship between the number of records of works and the calculation accuracy of the required time for work for each resource type based on the resource type information and the work time information (for example, Step S102), predicts the number of records of works to be performed in the future on the resource allocated to each process based on the use resource plan and the production plan information (for example, Step S105), determines the type of resource allocated to each process based on the use resource plan and the resource type information (for example, Step S106), and predicts the calculation accuracy of the required time for work in the use resource plan by applying the prediction result of the number of records of works and the determination result of the resource type to the relationship between the number of records of works and the calculation accuracy of the required time for work for each learned resource type (for example, Step S107).

As a result, it is possible to appropriately predict the calculation accuracy of the required time for work for each use resource plan.

(5) In (4) above, the resource type includes at least automatic facility that performs work without human intervention (for example, the value "automatic facility" of the resource type 503) and other types (for example, the value "facility+person" or "person" of the resource type 503).

As a result, it is possible to predict the calculation accuracy of the required time with high accuracy based on the variation in the work time according to the type of resource.

(6) In (1) above, the first procedure and the second procedure are executed for each of the plurality of use resource plans, and the use resource setting method further includes a fifth procedure in which the control unit selects one of the plurality of use resource plans according to a predetermined selection criterion based on the evaluation index (for example, processing of the use resource plan search function 1215 in Step S904).

As described above, it is possible to search for the use resource plan that maximizes the evaluation index and output the searched use resource plan based on the work time update accuracy with respect to the use resource plan and the prediction value in the range in which the KPI varies.

(7) In (6) above, in the fifth procedure, when the information designating one of the plurality of selection criteria is input (for example, when the input from the screen illustrated in FIG. 14 is performed), the control unit selects one of the plurality of use resource plans according to the designated selection criteria.

As a result, it is possible to set the use resource based on the selection criterion selected by the person.

(8) In (1) above, the plurality of selection criteria is any of a criterion that the evaluation index (for example, a planned KPI calculated in Step S203) not including a variation based on calculation accuracy of required time for work in the use resource plan is the highest, a criterion that an upper limit value of a range of a variation of the evaluation index (for example, an upper limit value of an actual KPI calculated in Step S204) is the highest, and a criterion that a lower limit value of the range of the variation of the evaluation index (for example, a lower limit value of an actual KPI calculated in Step S204) is the highest.

As a result, it is possible to set the use resource based on the selection criterion selected by the person.

(9) In the first procedure of (1), when the information designating any resource is input, the control unit predicts the calculation accuracy of the required time for the work in the use resource plan including the assignment of the designated resource to the work.

As a result, it is possible to evaluate the use resource plan including the resource freely designated by the person.

The above-described embodiments do not limit the present invention, and the present invention includes various modification examples. The above-described embodiments have been described in detail in order to describe the present invention in an easy-to-understand manner, and for example, it is not always necessary to include all the described configurations. Further, some components in one embodiment can also be replaced with the components in another embodiment, and the configuration of another embodiment can be added to the configuration of one embodiment. Regarding some components in the embodiments, other components can be added, deleted, and replaced.

Some or all of the configurations, functions, processing units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file that realizes each function can be stored in a memory, a recording device such as a hard disk and a solid state drive (SSD), or a computer-readable non-transitory data recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

What is claimed is:

1. A use resource setting method performed by a use resource setting device including a control unit and a storage unit, in which the storage unit holds resource type information, work time information, and production plan information, the resource type information includes information specifying a type of each resource allowed to be used for work of a process of producing a product, the work time information includes information indicating required time of work performed in the past by using each resource, and the production plan information includes information indicating the number of products planned to be produced, the use resource setting method comprising:

by the control unit, predicting calculation accuracy of required time of work in a use resource plan in which one or more resources are allocated to work in each process of producing the product, based on the resource type information, the work time information, and the production plan information; and by the control unit, predicting an evaluation index for producing the product when the use resource plan is adopted, based on the use resource plan, the work time information, and the production plan information, wherein the predicting of the evaluation index includes predicting a variation in the evaluation index based on the calculation accuracy of the required time of the work in the use resource plan by the control unit, wherein the predicting of the calculating accuracy and the predicting of the evaluation index are performed for each of a plurality of use resource plans, and the use resource setting method further comprises selecting one of the plurality of use resource plans according to a predetermined selection criterion based on the evaluation index by the control unit wherein in the selecting, when information designating any one of a plurality of selection criteria is input, the control unit selects the one of the plurality of use resource plans according to the designated selection criterion, and wherein the plurality of selection criteria is any one of a criterion that the evaluation index not including a variation based on calculation accuracy of required time for work in the use resource plan is the highest, a criterion that an upper limit value of a range of a variation of the evaluation index is the highest, and a criterion that a lower limit value of the range of the variation of the evaluation index is the highest.

2. The use resource setting method according to claim 1, wherein the storage unit further holds use resource information, the use resource information includes information specifying one or more resources allowed to be used for work of a process for each process of producing the product, the use resource setting method further comprises generating a plurality of use resource plans based on the use resource information by the control unit, and the predicting of the calculating accuracy and the predicting of the evaluation index are performed for each of the plurality of use resource plans generated in the generating.

3. The use resource setting method according to claim 1, further comprising:

by the control unit, outputting information for displaying a result of predicting the variation in the evaluation index on a screen.

4. The use resource setting method according to claim 1, wherein in the predicting of the calculation accuracy, the control unit learns a relationship between the number of records of the work and calculation accuracy of a required time for the work for each type of the resource based on the resource type information and the work time information, predicts the number of records of work to be performed in the future in the resource allocated to each process based on the use resource plan and the production plan information, determines the type of the resource allocated to each process based on the use resource plan and the resource type information, and predicts the calculation accuracy of the required time for work in the use resource plan by applying a prediction result of the number of records of the work and a determination result of the type of the resource to the learned relationship between the number of records of the work and the calculation accuracy of the required time for the work for each type of the resource.

5. The use resource setting method according to claim 4, wherein the type of the resource includes at least an automated facility that performs work without human intervention, and other types.

6. The use resource setting method according to claim 1, wherein in the predicting of the calculation accuracy, when information designating any resource is input, the control unit predicts calculation accuracy of required time for work in the use resource plan including allocation of the designated resource to the work.

7. A use resource setting device comprising:

a control unit; and a storage unit that holds resource type information, work time information, and production plan information, wherein the resource type information includes information specifying a type of each resource allowed to be used for work of a process of producing a product, the work time information includes information indicating required time of work performed in the past by using each resource, the production plan information includes information indicating the number of products planned to be produced, and the control unit predicts calculation accuracy of required time of work in a use resource plan in which one or more resources are allocated to work in each process of producing the product, based on the resource type information, the work time information, and the production plan information, predicts an evaluation index for producing the product when the use resource plan is adopted, based on the use resource plan, the work time information, and the production plan information, and predicts a variation in the evaluation index based on the calculation accuracy of the required time of the work in the use resource plan by the control unit, wherein the predicting of the calculating accuracy and the predicting of the evaluation index are performed for each of a plurality of use resource plans, and the use resource setting method further comprises selecting one of the plurality of use resource plans according to a predetermined selection criterion based on the evaluation index by the control unit wherein in the selecting, when information designating any one of a plurality of selection criteria is input, the control unit selects the one of the plurality of use resource plans according to the designated selection criterion, and wherein the plurality of selection criteria is any one of a criterion that the evaluation index not including a variation based on calculation accuracy of required time for work in the use resource plan is the highest, a criterion that an upper limit value of a range of a variation of the evaluation index is the highest, and a criterion that a lower limit value of the range of the variation of the evaluation index is the highest.

* * * * *